Oct. 15, 1963   J. M. CRAFTON   3,107,141
PROCESS OF APPARATUS FOR MOLDING ARTICLES EACH
HAVING A CENTRAL OPENING THERETHROUGH
Filed Aug. 7, 1961   4 Sheets-Sheet 2

INVENTOR.
John M. Crafton
BY
Jennings, Carter & Thompson
Attorneys

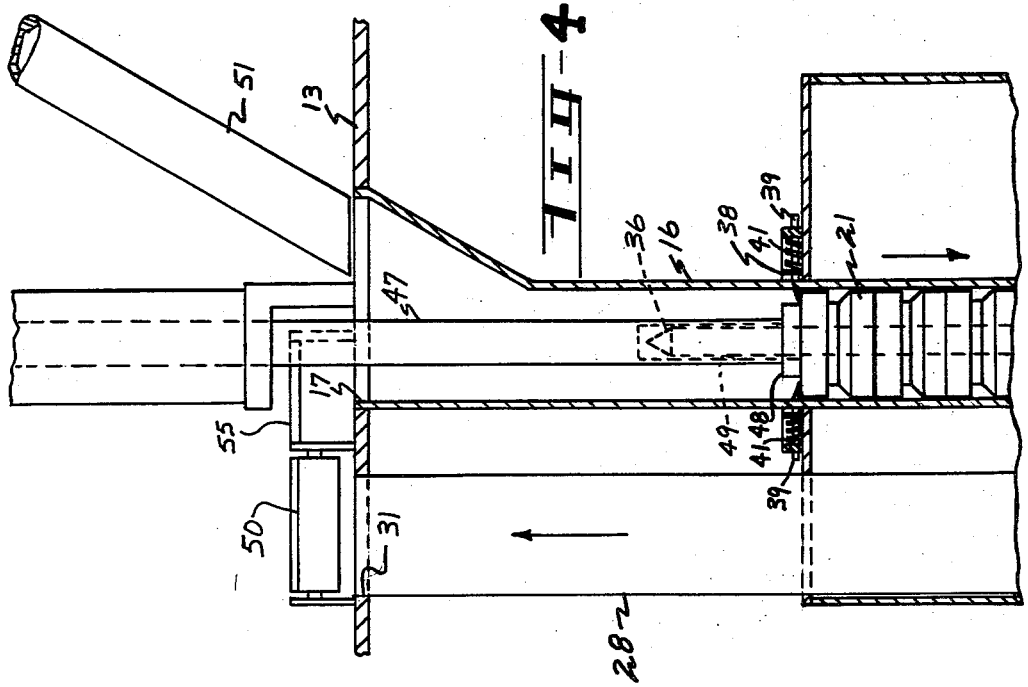
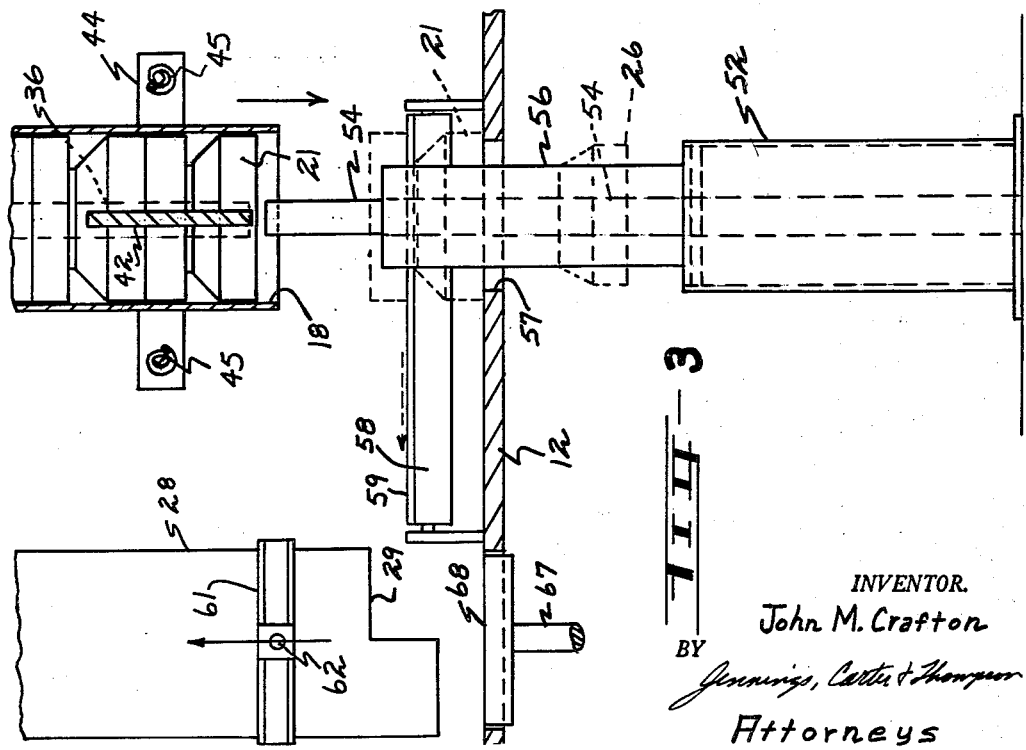

Oct. 15, 1963     J. M. CRAFTON     3,107,141
PROCESS OF APPARATUS FOR MOLDING ARTICLES EACH
HAVING A CENTRAL OPENING THERETHROUGH
Filed Aug. 7, 1961
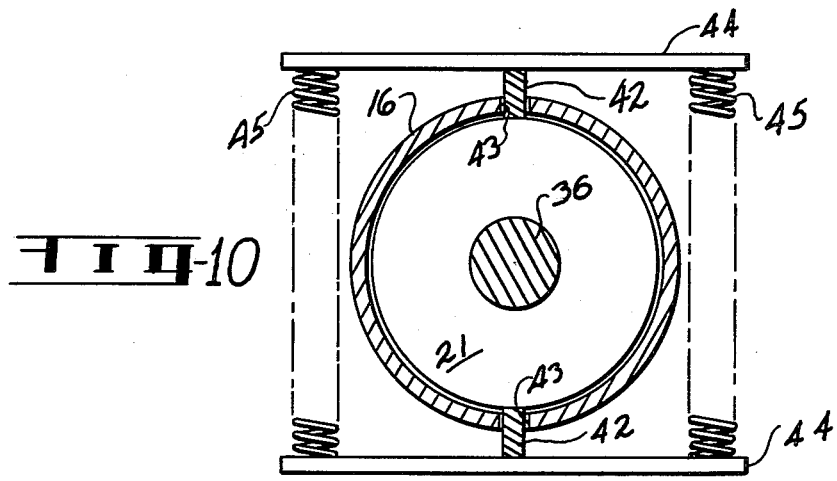
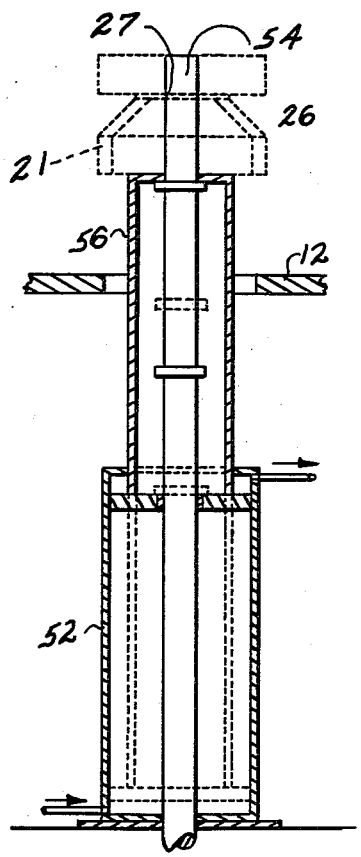
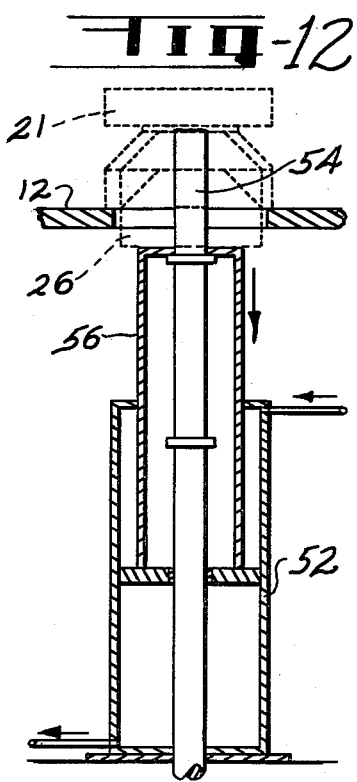
INVENTOR.
John M. Crafton
BY
Jennings Carter & Thompson
Attorneys

United States Patent Office 3,107,141
Patented Oct. 15, 1963

3,107,141
PROCESS OF APPARATUS FOR MOLDING ARTICLES EACH HAVING A CENTRAL OPENING THERETHROUGH
John M. Crafton, Morristown, Tenn., assignor to Woodcraft Corporation, a corporation of Alabama
Filed Aug. 7, 1961, Ser. No. 129,642
20 Claims. (Cl. 18—55)

This invention relates to a process and apparatus for molding articles and more particularly to such apparatus and process for forming molded articles from discrete particles mixed with a binder.

The present invention utilizes waste scrap material such as chips and sawdust obtained from woodworking plants, which material can be obtained at a very low cost and when mixed with a binder, such as a thermosetting resin, a cured molded product may be obtained for use as plugs for paper rolls, bolsters, furniture legs, and other similar articles. My invention forms the objects at a high production rate in a minimum of time.

It is an object of my invention to provide a process and apparatus for molding articles comprising placing a mixture of discrete particles and a binder within the cavities of a plurality of molds aligned in a row within a tube and moved step-by-step through the tube until a molded product is formed by the mixture through the application of heat and pressure.

A further object of my invention is to provide a process of molding a product of discrete articles mixed with a binder comprising placing within a tube a predetermined volume of mixed particles and binder, then positioning a cavity mold on the volume of material while supporting the material from an adjacent contacting mold, placing and maintaining pressure on the molds until the mixture has been cured, and then removing the cured product and the mold from an end of the tube.

Another object of my invention is to provide apparatus to mold a finished product of discrete particles mixed with a binder comprising a tube having a receiving end and a discharge end with a plurality of aligned cavity molds within the tube, means to move the molds through the tube in step-by-step relation, a curing oven about the tube to cure the molded product in the cavities of the molds, and means to apply pressure to the molds within the tube thereby to allow the molded product to be formed under the application of heat and pressure.

An additional object of my invention is to provide molding apparatus for forming a molded product having a central opening therethrough comprising a tube having a receiving end and a discharge end with cavity molds aligned within the tube and having central bores therethrough with a freely floating core within the tube extending through the central bores in the molds and being maintained in position by frictional engagement of the molds with the core.

Briefly described, my process and apparatus comprises a generally vertically directed tube with a plurality of aligned molds in a stack within the tube and having cavities on the underside thereof with central bores extending through the molds in the direction of travel of the molds through the tube. A freely floating core is positioned centrally within the tube and is held in position by frictional engagement of the core with the molds. Releasable latch means are provided at both the upper and lower ends of the tube and engage adjacent molds while means is provided at the upper end of the tube to "pack" successive molds in the upper end of the tube as they are added to the tube in step-by-step relation. Discrete particles mixed with a binder are added in a predetermined amount immediately before a mold is added to the upper end of the stack. The particles fall on the upper surface of the uppermost mold of the stack and when a mold is added to the stack thereafter the material is packed within the downwardly opening cavity of the added mold. Heat is applied within a curing chamber about the tube and the molded products within the molds are cured. At the end of the curing chamber, means are provided to separate the molds from the molded products and the empty molds are then returned to the upper end of the tube by a return chute.

Apparatus embodying features of my invention is shown in the accompanying drawings, forming a part of this application, in which:

FIG. 3 is a fragmentary enlarged view, partly in section, showing the lower portion of the molding apparatus with the means to remove the mold and molded product from the bottom end of the tube shown in its uppermost position;

FIG. 4 is a fragmentary enlarged view, partly in section, of the upper portion of the molding apparatus and showing means to push the molds in step-by-step successive relation onto the upper end of an aligned stack of molds in the tube and about particles on the upper surface of the stack thereby to form the molded product within the cavity of the mold;

FIG. 5 is a sectional view taken generally along the line 5—5 of FIG. 1;

FIG. 6 is a top plan view of a mold removed from the apparatus;

FIG. 7 is a sectional view of the mold shown in FIG. 6 taken generally along line 7—7 of FIG. 6;

FIG. 10 is a horizontal sectional view showing the lower latch means;

FIG. 11 is a fragmentary sectional view showing the means to remove the mold and molded product from the bottom end of the tube in its uppermost position; and, FIG. 12 is a fragmentary sectional view showing the means to remove the mold and molded product from the bottom of the tube in a position intermediate its uppermost and lowermost positions.

Figure 1:
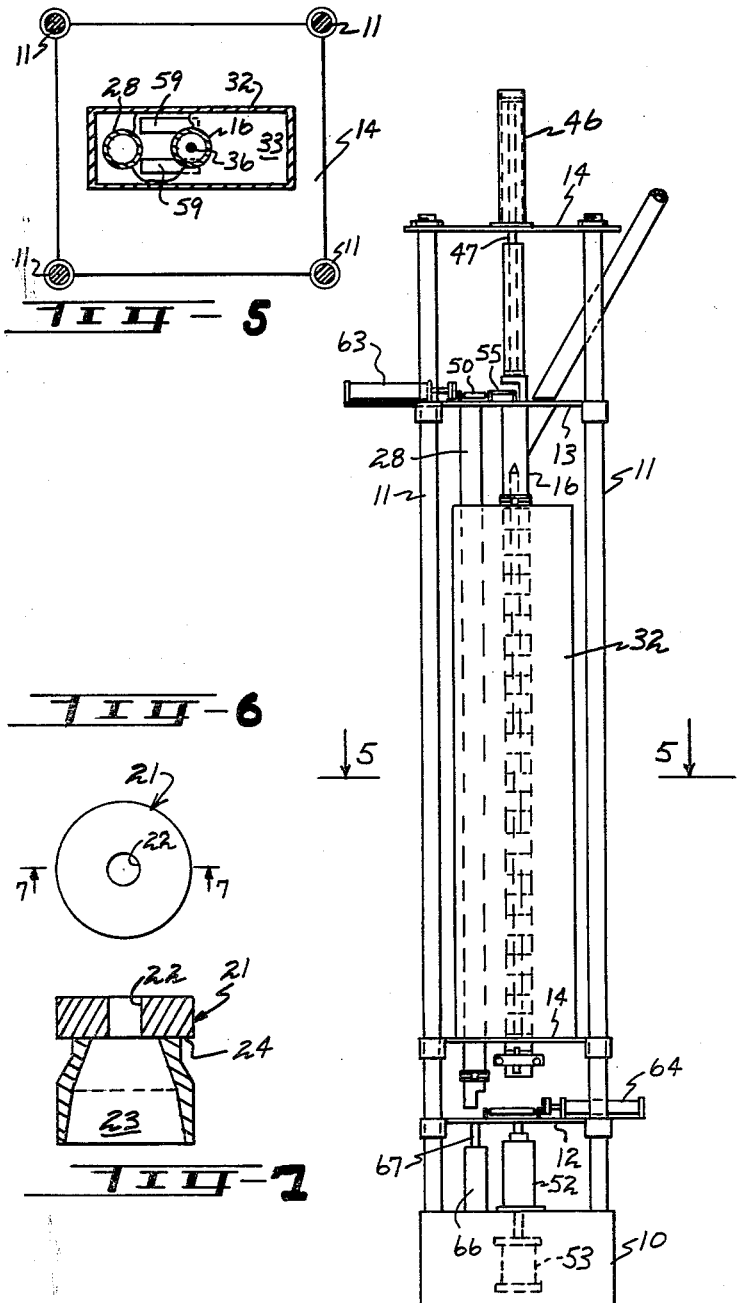
FIG. 1 is a side elevational view of my apparatus for forming molded articles from discrete particles mixed with a binder and showing a generally vertical tube through which the molds are passed in step-by-step relation.

Referring now to the drawings and more particularly to FIGS. 1-4, I show apparatus for molding articles from discrete particles mixed with a binder and which is specifically adapted to make end plugs for rolls of paper. Heretofore it has been common to use wooden plugs for the ends of paper rolls. Wood is porous and absorbs moisture. Thus, when wooden plugs dry, they contract and provide a loose fit between the roll of paper and the end plugs.

By forming the end plugs of paper rolls from discrete particles mixed with a binder, the moisture content can be kept within definable limits so that any contraction or expansion of the plugs is held to a minimum. Normally the discrete particles are formed of wood chips with the long dimension thereof running with the grain of the wood and of a generally uniform size, but other materials such as cottonseed hulls, sawdust, corn stalks or peanut hulls may be employed. A thermoactive resin, such as urea formaldehydre, may be mixed with the wood chips or sawdust to provide a suitable binder therefor.

My apparatus comprises a stand 10 on which vertical supports 11 are secured. A lower mold supporting table 12 is secured to supports 11 and an upper mold supporting table 13 is likewise secured to supports 11. Support plates 14 are secured to supports 11.

A generally vertical extending tube 16 is secured to plates 13 and 14. The upper end of tube 16 has a receiving end 17 through which empty molds are placed. Tube 16 has a lower discharge end 18 from which the filled molds are discharged.

Referring to FIGS. 6 and 7 a mold is indicated generally by the numeral 21 and comprises a central opening 22 therethrough. A cavity on the underside of mold 21 is indicated by the numeral 23 and a circumferential groove 24 forms a notch by which the mold may be guided.

Figure 8:
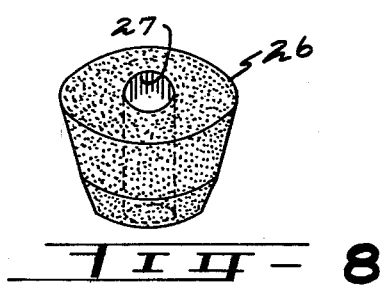
FIG. 8 is a perspective view of a finished molded article removed from a mold.

FIG. 8 discloses a finished molded product or article 26 having a central aperture 27 extending therethrough. Article 26 is of the same shape as cavity 23 of mold 21. A return chute or tube 28 is provided in parallel relation to tube 16 for returning empty molds 21 from discharge end of tube 16 to receiving end 17 of tube 16. Tube 28 has a lower receiving end 29 and an upper discharge end 31 for the empty molds. A curing oven or chamber 32 is provided about tubes 16 and 28. Curing oven or chamber 32 is provided about tubes 16 and 28. Curing oven 32 is heated to a temperature of between 350° F. and 375° F. Electric coils 33 with suitable controls for controlling the temperature are provided adjacent tube 16 for heating tube 16.

A freely floating core comprising a rod 36 is positioned centrally within tube 16 and extends from a position below receiving end 17 as shown in FIG. 4 to a position slightly above discharge end 18 as shown in FIG. 3. Core 36 fits within apertures 22 of molds 21 and is held in place by frictional engagement with the stack of aligned molds 21 in tube 16. Core 36 is formed of several tapers to allow molds 21 to slide easily therealong as individual molds are added in step-by-step relation. In forming a finished molded product 26 having an opening of generally one inch diameter and a core 36 of around 6 feet in length, the diameter of core 36 at its upper end is 15/16 inch and increases in diameter to one inch at a position 6 inches below the upper end of core 36. Thereafter, the core tapers to a diameter slightly less than one inch and then increases in size back to one inch at a position approximately 6 inches from the lower end of the core. A uniform diameter of one inch is held for the last 6 inches of the core 36.

Latch means on the upper end of tube 16 to hold molds 21 in position comprises a ring 38 having a pair of spring biased plunger pins 39 thereon. Spring 41 biases pins 39 inwardly and pins 39 engage the upper surface of the uppermost mold 21 to hold the mold thereat. Pins 39 are beveled on their upper surfaces to allow them to be displaced upon downward pressure thereon.

As shown in FIG. 10, lower latch means comprises a pair of opposed friction plates 42 which fit in slots 43 extending through tube 16 and bear against the outer circumference of molds 21. A bar 44 is secured to the outer end of each plate 42 and springs 45 urges plates 42 into engagement with the outer circumference of molds 21 to hold molds 21 in position.

To add a mold 21 to tube 16, cylinder 46 having a piston rod 47 is secured to upper plate 14. A plate 48 secured to the lower end of piston rod 47 is adapted to engage the upper surface of mold 21. FIG. 1 shows piston rod 47 in its uppermost position in which a mold 21 is adapted to be positoined within receiving end 17 of tube 16. FIG. 4 shows piston rod 47 at its lowermost position in contact with the uppermost mold 21 after the mold has been engaged with pins 39. The lower portion of piston rod 47 is hollow as at 49 and the upper beveled end of core 36 fits within hollow portion 49 which also extends through plate 48.

A charge of mixed particles and binder is fed to the upper surface of a mold 21 with piston 47 in the position shown in FIG. 1. The particles are fed through a discharge chute 51 into an opening adjacent the upper end of tube 16. Discharge chute 51 may receive the particles from a suitable storage bin (not shown) and suitable feed means (not shown) may feed predetermined amounts of particles through chute 51. Thereafter, an empty mold 21 is positioned in the receiving end of tube 16 and cylinder 46 is actuated to push the empty mold downwardly onto the upper surface of the subjacent mold until it is latched by pins 39 with the mixture of particles and binder being received within the downwardly opening cavity of the mold and compressed therein.

Figure 2:
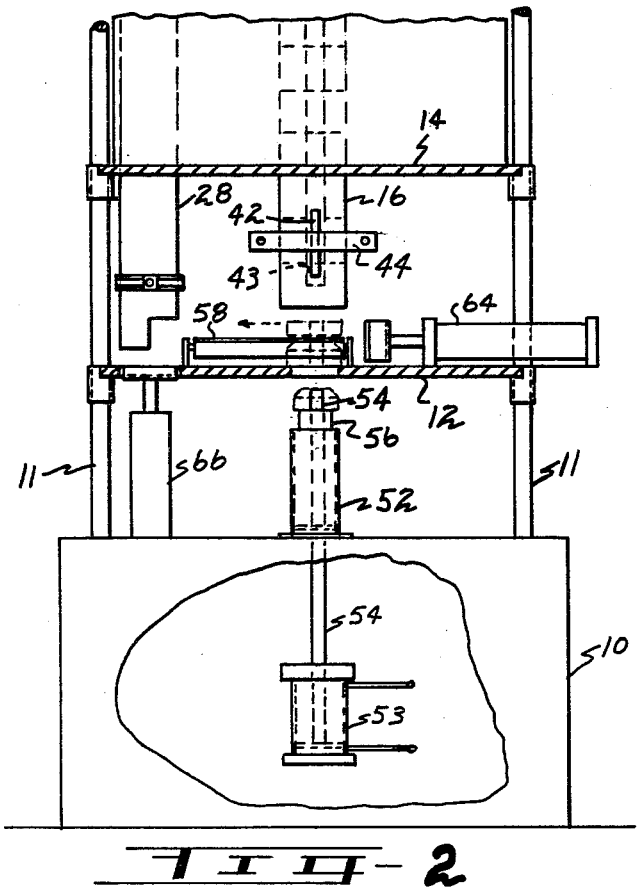
FIG. 2 is an enlarged fragmentary elevational view of the lower portion of the apparatus shown in FIG. 1 and showing means to remove the mold and molded article therein from the lower end of the tube in its lower position.

Referring to FIGS. 2 and 3, upper and lower cylinders 52 and 53 respectively are provided on stand 10. Piston rod 56 of cylinder 52 extends through cylinder 52 and is connected to piston rod 54 which is operatively connected at its lower end to cylinder 53 so that rod 54 and cylinder 53 move with rod 56. Piston rod 54 of cylinder 53 extends through piston rod 56 and is suitably connected to piston rod 56 for movement upwardly and downwardly with piston rod 56 such as by stops on rod 54. When cylinder 52 is actuated, cylinder 53 and rods 54, 56 move upwardly until rod 56 is positioned the distance of the height of one mold from the lowermost mold 21 in tube 16. Cylinder 46 is then actuated to push the lowermost mold 21 onto the upper surface of rod 56. Upon actuation of cylinder 46 the aligned stack of molds 21 slides frictionally relative to floating rod 36 and floating rod 36 thereby normally remains in a relatively fixed vertical relation. In the event rod 36 did move downwardly piston rod 54 would push rod 36 upwardly when cylinder 53 is actuated to move rod 54 within the opening of article 26. Next, cylinder 53 is actuated and rod 54 moves relative to rod 56 through the opening in article 26 within the cavity of the lowermost mold 21. On the downward stroke, piston rod 54 and cylinder 53 move downwardly with rod 56 and molded article 26 is pulled by rod 54 from mold 21 through opening 57 of table 12. When rod 56 stops, cylinder 53 is actuated to move rod 54 downwardly relative to rod 56 and to pull rod 54 from the opening of the molded article 26. Article 26 thus is resting on the upper surface of rod 56 and may be removed by suitable means (not shown) from the upper surface of rod 56. Opening 57 (see FIG. 3) in table 12 is of a diameter to permit articles 26 to pass therethrough while restraining molds 21. Table 12 is adjustable in a vertical direction to permit the apparatus to use molds of different heights.

Lower guides 58 are formed of spring angle members and an upper leg 59 of guides 58 engages groove 24 in the lowermost mold 21 to retain and guide mold 21 from the discharge end of tube 16 to the receiving end of return tube 28. Upper spring angle guides 50 are disposed adjacent the upper end of tube 28 and resilient bars 55 are mounted adjacent the ends of guides 50 and extend to a position within tube 16 through the cut-out receiving end 17 to hold an empty mold 21 thereat until it is pushed downwardly by piston rod 47. Bars 55 which engage groove 24 give when piston rod 47 pushes the retained mold downwardly. Latch means 61 on the tube 28 comprises spring actuated pins 62 which engage circumferential groove 24 in molds 21 at the lower end of return tube 28. An upper air cylinder 63 moves empty molds from the upper end of tube 28 to receiving end 17 of tube 16. A lower air cylinder 64 moves empty molds from the lower end of tube 16 to the lower end of tube 28. A fluid cylinder 66 having a piston rod 67 with a support 68 thereon is positioned directly beneath tube 28. Upon actuation of cylinder 66, an empty mold 21 resting on support 68 will be moved upwardly until latch pins 62 engage the mold.

Figure 9:
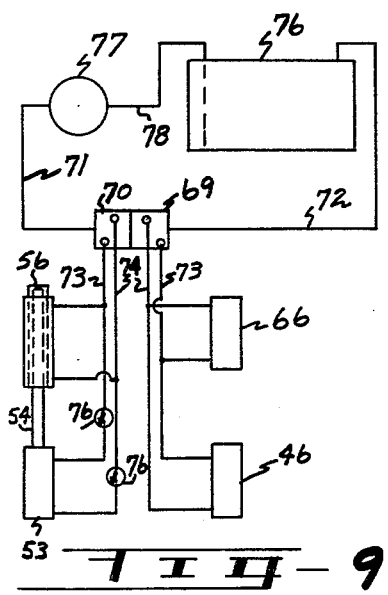
FIG. 9 is a diagrammatic view of the fluid system for operating the molded apparatus.

Referring now to FIG. 9 in which a schematic drawing of the fluid system is shown, I show a reservoir 76 and a pump 77 connected by line 78. Fluid is supplied by pump 77 to valves 69 and 70 through line 71. A return line 72 returns fluid from valves 69 and 70 to reservoir 76. Lines 73 and 74 supply fluid from valves 69 and 70 to cylinders 46, 52, 53 and 66. Suitable flow control bleed-off valves 76 control the actuation of cylinder 53. At the end of a stroke of cylinder 52, pressure increases to actuate a flow control valve 76 which actuates cylinder 53. Thus, cylinder 53 is actuated only at the end of a stroke of cylinder 52. Cylinders 46 and 66 are actuated simultaneously. Air cylinders 63 and 64 are operated simultaneously by separate controls (not shown).

In operation, with wood chips of a uniform size dried and mixed with a suitable thermosetting resin such as urea formaldehyde, and with freely floating rod 36 in position, a plug is first inserted about core 36 to start the apparatus at the beginning of a work day. Thereafter molds 26 are added individually until tube 16 is filled with an aligned stack of molds 26 and the plug is discharged. The plug is of a size to hold the stack under pressure as the stack builds up step-by-step in tube 16. A charge of mixed particles and binder is fed through chute 51 onto the upper surface of a mold fitting about core 36. After the charge of an amount to form a single molded article has been fed within tube 16, an empty mold 21 is positioned within receiving end 17 and is retained by resilient bars 55. It is understood that piston rod 47 is then in its uppermost position as shown in FIG. 1. Next, valve 70 is actuated and cylinder 52 is actuated to move cylinder 53 and piston rod 56 upwardly. Piston rod 56 terminates at a distance beneath the lowermost mold 21 in tube 16 substantially the height of a mold. Fluid pressure increases in line 74 to actuate valve 76 and fluid is then supplied to cylinder 53 to move piston rod 54 upwardly substantially the height of a mold. Then, valve 69 is actuated and piston rod 47 moves downwardly while piston rod 67 moves upwardly. Piston rod 67 raises a mold on support 68 upwardly within return tube 28 assuming return tube 28 to be full of empty molds and an empty mold on the upper end of the stack is positioned adjacent air cylinder 63. A filled mold 21 is pushed downwardly onto piston rods 54 and 56 by piston rod 47 and rod 54 fits within opening 27 in finished molded product 26 in the cavity of the lowermost mold 21, as shown in FIG. 11. Piston rod 47 pushes the uppermost mold 21, which is being retained by bars 55, downwardly about the particles and binder on the upper surface of the subjacent mold until pins 39 engage the upper surface of the mold. Filled molds 21 pass through curing chamber 32 which is heated to a temperature of between 350° F. and 375° F. The molds 21 remain in curing chamber 32 for approximately three minutes and the molded product is cured therein. Cylinders 46 and 66 are then actuated in the opposite direction along with cylinder 52. When piston rod 56 reaches the end of its downward stroke, pressure increases in line 73 and valve 76 therein is actuated to actuate cylinder 53. Leg 59 engages groove 24 as piston rod 56 moves downwardly and retains mold 21 thereat. As shown in FIG. 12, the molded product 26 is pulled beneath supporting table 12 by the downward movement of rod 54 below table 12. A chute or other means (not shown) may be provided beneath table 12 to receive the finished articles 26. Next, air cylinders 63 and 64 may be actuated to move the empty molds at the discharge ends of tube 16 and return tube 28 to the receiving ends 17 and 29. After air cylinders 63 and 64 have been actuated and empty molds 21 have been moved, valve 69 is again actuated to begin another cycle.

From the foregoing, it will be understood that I have provided a process and apparatus for molding articles comprising placing a mixture of discrete particles and a binder within the cavities of a plurality of molds aligned in a row within a tube and moved step-by-step through the tube until a molded product is formed from the mixture. My molding apparatus is more particularly adapted for forming a molded product having a central opening therethrough comprising a tube with a plurality of cavity molds aligned within the tube and having central bores therethrough, and a freely floating core within the tube extending through the central bores in the mold whereby the core is maintained in position by frictional engagement of the molds with the core. Pressure is maintained on the aligned stack of molds within the tube by having latch means adjacent the upper and lower ends of the stack and the stack is moved through a curing chamber which is heated to a proper temperature for the thermosetting resin holding the discrete particles together. The finished molded products are formed at a high production rate in a minimum of time and the operation is practically entirely automatic. While the upper end of tube 16 has been shown as the receiving end and the lower end as the discharge end, it is understood that the movement of the molds through the tube may be reversed, if desired.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. The process of molding a centrally apertured product from a mixture of discrete particles and a binder comprising, moving a plurality of aligned, centrally apertured molds filled with a predetermined volume of said mixture step-by-step along a rod passing through the apertures of the molds and positioned within a tube centrally of the longitudinal axis thereof, applying a compressive force to the mixture in the molds as the molds move between a receiving end of the tube and a discharge end thereof along the rod thereby to form molded products within the molds, and removing the molded products from the discharge end of the tube.

2. The process of molding a centrally apertured product from a mixture of discrete particles and a binder comprising, moving a plurality of aligned centrally apertured molds having cavities therein filled with a predetermined volume of said mixture along a rod passing through the apertures of a mold and positioned within a tube centrally of the longitudinal axis thereof, applying a compressive force to the mixture in the cavities of the molds as the molds move between a receiving end of the tube and a discharge end thereof, maintaining the mixture under a compressive force as the molds move along the rod and through the tube, curing the mixture within the cavities of the molds for a predetermined time while the mixture is under a compressive force within the tube thereby to form the molded product, and removing the molds and the molded apertured products therein from the discharge end of the tube.

3. The process of molding a finished product of discrete particles mixed with a binder, comprising placing a predetermined volume of mixed particles and binder within an upper end of a tube, positioning a downwardly opening cavity mold over the volume of material while supporting the material from a subjacent mold, applying pressure to the uppermost mold while the other mold is restrained thereby to form the product, maintaining the mixture under pressure as it is moved step-by-step through a curing chamber about the tube for the time required to cure the product, and removing the mold and product from a lower discharge end of the tube after the product leaves the curing chamber.

4. The process of molding a finished product of discrete particles mixed with a binder, comprising placing a predetermined volume of particles mixed with a binder within a generally vertically directed tube on the upper surface of a downwardly opening cavity mold within the tube, positioning a second downwardly opening cavity mold about said volume of material and on the upper surface of said first mentioned mold in alignment therewith, applying pressure to one mold while the other mold is restrained and maintaining the mixture under pressure as it is moved step-by-step through a curing chamber about the tube for the time required to cure the mixture, stripping the cured product from the mold, moving the mold laterally of its path of movement through the tube after it is discharged from the lower end of the tube, moving the mold upwardly through a return chute to a position adjacent the upper end of the first named tube, and moving the empty mold laterally from the return chute to the tube.

5. The process of molding a product with a central aperture therethrough of discrete particles mixed with a binder, comprising placing within a generally vertically directed tube a predetermined volume of mixed particles and binder on the surface of a downwardly opening cavity mold within the tube, positioning a second downwardly opening cavity mold having a central aperture therethrough on the surface of said first mentioned mold and about the volume of particles with a central rod in the tube passing through said central aperture, applying pressure to the molds, passing the filled molds through a curing chamber, stripping the product and the mold from an end of the central rod adjacent an end of the tube, and separating the product from the mold.

6. The process of molding a product with a central aperture therethrough of discrete particles mixed with a binder, comprising placing within a receiving end of a generally vertically directed tube a predetermined volume of mixed particles and binder on the exposed surface of a mold within the receiving end of the tube, positioning a second mold having a central aperture therethrough on the surface of said first mentioned mold and about the volume of particles with a central rod in the tube passing through the central aperture, applying pressure to the molds, passing the filled molds through a curing chamber, removing the molds and products therein from an end of the rod, inserting a movable plunger in the aperture of the product within the mold and removing the plunger from the mold thereby to pull the product from an end of the mold, moving the empty mold laterally of its path within the tube to a return chute, and moving the empty mold within the return chute to a position adjacent the receiving end of the tube.

7. The process of molding a product with a central aperture therethrough of discrete particles mixed with a binder, comprising placing within a generally vertically directed tube a predetermined volume of mixed particles and binder on a mold within the tube, positioning a second mold having a central aperture therethrough on a central rod in the tube and about said volume while supporting the volume on said first mentioned mold, passing the filled molds through a curing chamber, removing the mold and product from the lower end of the rod, inserting a vertically movable plunger in the aperture of the product within the mold and removing the plunger from the mold thereby to pull the product from the lower end of the mold, moving the mold laterally of its path of movement through the tube to the lower end of a return tube, moving the empty mold upwardly through the return tube to a position adjacent the upper end of the first named tube, and moving the empty mold laterally from the upper end of the return tube to the upper end of said first named tube.

8. In apparatus to mold a product of discrete particles mixed with a binder, a tube having a receiving end and a discharge end, a plurality of aligned cavity molds within said tube, means to move the molds step-by-step from the receiving end thereof to the discharge end, said molds being positioned individually within the receiving end of the tube and having a charge of discrete particles and binder between adjacent molds thereby to fill the cavities of the molds, a curing oven about said tube to cure the particles in the molds, and means adjacent the discharge end of the tube to remove the mold and molded product therein from the tube.

9. In molding apparatus, an upper tube having a receiving end and a lower discharge end, a plurality of cavity molds placed end-to-end within said tube to form an aligned series of molds, said molds being positioned individually within the receiving end of the tube and having a charge of material between adjacent molds thereby to fill the cavities of the molds and to form a molded product, means to apply pressure to the series of molds within the tube, a curing oven about said tube to cure the material in the molds, and means to remove a mold and molded product in the cavity thereof as the molding operation progresses step-by-step.

10. In molding apparatus, a tube having a receiving end and a discharge end, a plurality of cavity molds placed end-to-end within said tube to form an aligned series of molds, latch means at the discharge end of the tube engaging an adjacent mold to restrain movement thereof, said molds being positioned individually within the receiving end of the tube and having a charge of material between adjacent molds to form a molded product, means to apply pressure to the series of molds within the tube, a curing oven about said tube to cure the particles in the molds, means adjacent the discharge end of the tube to remove a mold and molded product therein from the discharge end of the tube after the latch means thereat has released the mold, a return tube for empty molds adjacent and generally parallel to the first mentioned tube and having receiving and discharge ends positioned adjacent the discharge and receiving ends, respectively, of said first mentioned tube, and means to move the empty molds from the receiving end of said return tube to the discharge end thereof.

11. In molding apparatus, a tube having a receiving end and a discharge end, a plurality of cavity molds placed end-to-end within said tube to form an aligned series of molds, latch means at the receiving end of said tube engaging the adjacent mold to restrain movement thereof, latch means at the discharge end of the tube engaging an adjacent mold to restrain movement thereof, said molds being positioned individually within the receiving end of the tube and having a charge of material between adjacent molds to form a molded product, means to apply pressure to the series of molds within the tube, a curing oven about said tube to cure the material in the molds, means adjacent the discharge end of the tube to remove the molds and molded products therein from the discharge end of the tube after the latch means thereat has released the molds, a return tube for empty molds adjacent and generally parallel to the first mentioned tube and having receiving and discharge ends positioned adjacent the discharge and receiving ends, respectively, of said first mentioned tube, means to remove the molded product from the mold, means to move the empty mold transversely of its movement in the tube from the discharge end of the first mentioned tube to the receiving end of the return tube, means to move the empty molds from the receiving end of said return tube to the discharge end thereof, and means to move the empty molds transversely of their movement in the return tube from the discharge end of the return tube to the receiving end of the first mentioned tube.

12. In molding apparatus, a tube having a receiving end and a discharge end, a plurality of cavity molds placed end-to-end within said tube to form an aligned series of molds, latch means at the receiving end of said tube engaging an adjacent mold to restrain movement thereof, latch means at the discharge end of the tube engaging an adjacent mold to restrain movement thereof, said molds being positioned individually within the receiving end of the tube and having a charge of material between adjacent molds to form a molded product, means to apply pressure to the series of molds within the tube, a curing oven about said tube to cure the material in the molds, means adjacent the discharge end of the tube to remove a mold and molded product therein from the discharge end of the tube, means to remove the molded product from the mold, a return tube for empty molds adjacent and generally parallel to the first mentioned tube and having receiving and discharge ends positioned adjacent the discharge and receiving ends, respectively, of the first mentioned tube, a movable plunger disposed in alignment with and spaced from the receiving end of the return tube, means to move said plunger when an empty mold is placed between the plunger and the receiving end of the discharge tube and to push the empty mold into the return tube, and means adjacent the receiving end of the return tube to hold the empty mold in place within the return tube.

13. In molding apparatus, a generally vertically directed tube having an upper receiving end and a lower discharge end, a plurality of cavity molds placed end-to-end within said tube to form an aligned stack of molds and having a mixture of discrete particles and binder within the cavities of the molds, means to move the molds progressively step-by-step from the receiving end thereof to the discharge end, a curing oven about the tube to cure the mixture within the molds, means to place the molds under pressure while in the curing oven, and means to remove progressively a mold and product therein at the lower end of the tube.

14. In molding apparatus, a generally vertically directed tube having an upper receiving end and a lower discharge end, a plurality of cavity molds placed end-to-end within said tube to form an aligned stack of molds and having a mixture of discrete particles and binder within the cavities of the molds, means to move the molds progressively step-by-step from the receiving end thereof to the discharge end, a curing oven about the tube to cure the mixture within the molds, releasable means adjacent the lower end of the tube to restrain movement of the mold thereat, means to place the molds under pressure, means to remove a mold and cured product therein at the lower end of the tube, means to remove the cured product from the mold, a generally vertically extending return tube extending generally parallel to the first mentioned tube and having a lower receiving end and an upper discharge end, and means to move empty molds from the receiving end of the return tube to the discharge end thereof.

15. In molding apparatus, a generally vertically directed tube having an upper receiving end and a lower discharge end, a plurality of cavity molds placed end-to-end within said tube to form an aligned stack of molds and having a mixture of discrete particles and binder within the cavities of the molds, means to move the molds progressively step-by-step from the receiving end thereof to the discharge end, a curing oven about the tube to cure the mixture within the molds, releasable means adjacent the lower end of the tube to restrain movement of the mold thereat, means to place the molds under pressure while in the curing oven, said molds having cavities opening on the underside thereof, means to remove the molded products from the cavities on the underside of the molds, and means to remove the molds from the discharge end of the tube after the releasable means at the discharge end of the tube releases the lowermost mold.

16. In molding apparatus to make a molded product having a central opening therethrough and formed of a mixture of discrete particles and a binder, a tube having a receiving end and a discharge end, a plurality of aligned cavity molds in a row within said tube and having a central bore therethrough, said cavity molds being filled with said mixture, a core within the tube extending through the central bore in the molds and the mixture, a curing oven about said tube to cure the molded products in the molds, means to place and maintain the aligned molds under pressure within the tube, and means adjacent the discharge end of the tube to remove the molded products and molds from the tube.

17. In molding apparatus to make a molded product having a central opening therethrough and formed of a mixture of discrete particles and a binder, a tube having a receiving end and a discharge end, a plurality of aligned cavity molds in a row within said tube and having a central bore therethrough, said cavity molds being filled with said mixture, said molds having cavities opening in the direction of movement of the molds through the tube and moving progressively through the tube in steps of distances substantially equal to the longitudinal dimension of a mold, a freely floating core within the tube extending through the mixture and the central bores in the molds and held in position by frictional engagement with the molds, a curing oven about the tube to cure the molded product within the cavities of the molds, means to place the aligned molds under pressure within the tube while the molded product therein is being cured, and means to move the molds progressively in step-by-step relation through the tube and relative to the core.

18. In molding apparatus to make a molded product having a central opening therethrough and formed of a mixture of discrete particles and a binder, a tube having a receiving end and a discharge end, a plurality of aligned cavity molds in a row within said tube and having central bores therethrough, said molds having cavities opening in the direction of movement of the molds through the tube and moving progressively through the tube in steps of distances substantially equal to the longitudinal dimension of a mold, a freely floating core within the tube extending through the central bores in the molds and held in position by frictional engagement with the molds, a curing oven extending about the tube to cure the molded product within the cavities of the molds, means at the lower end of the row to restrain the movement of the aligned row of molds, means to place the row under pressure, means to move the molds progressively in step-by-step relation through the tube and relative to the core, and means to remove the molds and molded products therein from the discharge end of the tube.

19. In molding apparatus to make a molded product having a central opening therethrough and formed of a mixture of discrete particles and a binder, a tube having a receiving end and a discharge end, a plurality of aligned cavity molds in a row within said tube and having central bores therethrough, said molds having cavities opening in the direction of movement of the molds through the tube and moving progressively through the tube in steps of distances substantially equal to the longitudinal dimension of a mold, a freely floating core within the tube extending through the central bores in the molds and held in position by frictional engagement with the molds, a curing oven extending about the tube to cure the molded product within the cavities of the molds, releasable means at each end of the row to restrain the movement of the aligned row of molds, means to move the molds progressively in the tube relative to the core upon the addition of a mold at the receiving end of the tube and to exert pressure upon each mold added to the receiving end of the tube thereby to maintain pressure on the aligned row of molds between the releasable means, and means to remove a mold and molded product from the discharge end of the tube upon the addition of each mold to the tube.

20. In molding apparatus to make a molded product having a central opening therethrough and formed of a mixture of discrete particles and a binder, a generally vertically directed tube having an upper receiving end and a lower discharge end, a plurality of molds in said tube positioned in an aligned stack, each of said molds having a cavity opening on the underside thereof and a vertically extending bore therethrough, a freely floating core within the tube and extending through the bores in the molds, a curing oven about said tube to cure the mixture in the molds, releasable means at each end of the stack to restrain the movement of the stack of molds, means to move progressively the stack of molds down the tube in step-by-step relation relative to the core upon the addition of a mold at the upper end of the tube and to exert pressure upon each mold added at the upper end of the tube thereby to maintain pressure on the stack of molds between the releasable means, and means to remove a mold and molded product from the discharge end of the tube upon the addition of each mold to the tube.

References Cited in the file of this patent

UNITED STATES PATENTS

| | | |
|---|---|---|
| 2,560,491 | Smith et al. | July 10, 1951 |
| 2,586,822 | Honeyman et al. | Feb. 26, 1952 |
| 2,873,475 | Linhorst | Feb. 17, 1959 |
| 2,943,347 | Archibald | July 5, 1960 |